US012711578B2

(12) United States Patent
Maltese et al.

(10) Patent No.: US 12,711,578 B2
(45) Date of Patent: Aug. 18, 2026

(54) OPTICAL IMAGING

(71) Applicant: Oxford University Innovation Limited, Oxford (GB)

(72) Inventors: Giorgio Maltese, Oxford (GB); Anastasiia Pushkina, Oxford (GB); Josje da Costa Filho, Oxford (GB); Alexander Lvovsky, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 18/556,891

(22) PCT Filed: Apr. 26, 2022

(86) PCT No.: PCT/GB2022/051050

§ 371 (c)(1),
(2) Date: Oct. 24, 2023

(87) PCT Pub. No.: WO2022/229622

PCT Pub. Date: Nov. 3, 2022

(65) Prior Publication Data

US 2024/0212095 A1 Jun. 27, 2024

(30) Foreign Application Priority Data

Apr. 29, 2021 (GB) ..................................... 2106159

(51) Int. Cl.
*G06T 3/4069* (2024.01)
*G02B 21/36* (2006.01)
(Continued)

(52) U.S. Cl.
CPC .......... *G06T 3/4069* (2013.01); *G02B 21/367* (2013.01); *G06T 3/4046* (2013.01);
(Continued)

(58) Field of Classification Search
CPC ..... G06T 3/4046; G06T 3/4069; G06V 20/69; G06V 10/774; G06V 10/82; G02B 21/367;
(Continued)

(56) References Cited

U.S. PATENT DOCUMENTS

2018/0173980 A1* 6/2018 Fan ........................ G06V 40/45

FOREIGN PATENT DOCUMENTS

KR 20180032947 A * 4/2018

OTHER PUBLICATIONS

English Translation of KR 20180032947 A (Year: 2025); pp. 1-27.*
(Continued)

*Primary Examiner* — Jimmy H Nguyen
(74) *Attorney, Agent, or Firm* — Thomas|Horstemeyer, LLP

(57) ABSTRACT

A method (100) of training an image processing unit (27) for use in optical imaging, the method (100) comprising: providing (102) a training object (37); computing (104) a plurality of theoretically expected signals generated by detecting the component of the electromagnetic field arriving from the object (37) in each of a plurality of different spatial modes of light; and generating (106) a reconstructed image (39) based on the theoretically expected signals, wherein the reconstructed image (39) is provided as a label for the training object (37) for use in training the image processing unit (27).

20 Claims, 10 Drawing Sheets

(51) Int. Cl.
*G02B 27/10* (2006.01)
*G06T 3/4046* (2024.01)
*G06V 10/774* (2022.01)
*G06V 10/82* (2022.01)
*G02B 26/08* (2006.01)
*G02B 27/09* (2006.01)
*G06V 20/69* (2022.01)

(52) U.S. Cl.
CPC ...... *G02B 26/0833* (2013.01); *G02B 27/0927* (2013.01); *G02B 27/0944* (2013.01); *G02B 27/106* (2013.01); *G06V 10/774* (2022.01); *G06V 10/82* (2022.01); *G06V 20/69* (2022.01)

(58) Field of Classification Search
CPC ............ G02B 26/0833; G02B 27/0944; G02B 27/0927; G02B 27/106
USPC .................................................. 345/694, 108
See application file for complete search history.

(56) References Cited

OTHER PUBLICATIONS

M. Tsang, R. Nair, and X.-M. Lu, Quantum theory of super-resolution for two incoherent optical point sources, Phys. Rev. X 6, 031033 (2016).
N. K. Fontaine, R. Ryf, H. Chen, D. T. Neilson, K. Kim, and J. Carpenter, Scalable mode sorter supporting 210 Hermite-Gaussian modes, in Optical Fiber Communication Conference Postdeadline Papers (Optical Society of America, 2018) p. Th4B.4.
M. Hiekkamaki, S. Prabhakar, and R. Fickler, Near-perfect measuring of full-field transverse-spatial modes of light, Opt. Express 27, 31456 (2019).
Y. Zhou, J. Zhao, Z. Shi, S. M. H. Rafsanjani, M. Mirhosseini, Z. Zhu, A. E. Willner, and R. W. Boyd, Hermite-Gaussian mode sorter, Opt. Lett. 43, 5263 (2018).
F. Yang, A. Tashchilina, E. S. Moiseev, C. Simon, and A. I. Lvovsky, Far-field linear optical superresolution via heterodyne detection in a higher-order local oscillator mode, Optica 3, 1148 (2016).
Z. S. Tang, K. Durak, and A. Ling, Fault-tolerant and finite-error localization for point emitters within the diffraction limit, Opt. Express 24, 22004 (2016).
M. Paür, B. Stoklasa, Z. Hradil, L. L. Sánchez-Soto, and J. Rehacek, Achieving the ultimate optical resolution, Optica 3, 1144 (2016).
W.-K. Tham, H. Ferretti, and A. M. Steinberg, Beating Rayleigh's curse by imaging using phase information, Phys. Rev. Lett. 118, 070801 (2017).
M. Parniak, S. Borówka, K. Boroszko, W. Wasilewski, K. Banaszek, and R. Demkowicz-Dobrza'nski, Beating the Rayleigh limit using two-photon interference, Phys. Rev. Lett. 121, 250503 (2018).
M. Tsang, Subdiffraction incoherent optical imaging via spatial-mode demultiplexing, New Journal of Physics 19, 023054 (2017).
M. Tsang, Quantum limit to subdiffraction incoherent optical imaging, Phys. Rev. A 99, 012305 (2019).
A. Pushkina, J. Costa-Filho, G. Maltese and A. Lvovsky, Comprehensive model and performance optimization of phase-only spatial light modulators, Meas. Sci. Technol. 31 125202 (2020).
E. Bolduc, N. Bent, E. Santamato, E. Karimi, and R. Boyd, Exact solution to simultaneous intensity and phase encryption with a single phase-only hologram, Opt. Lett. 38, Issue 18, pp. 3546-3549 (2013).
A. Forbes, A. Dudley, and M. McLaren, Creation and detection of optical modes with spatial light modulators, Advances in Optics and Photonics 8, 200 (2016).
International Search Report and Written Opinion for WO 2022/229622 (PCT/GB2022/051050), dated Aug. 2, 2022, pp. 1-8.
UK Search Report for GB 2106159.3, dated Sep. 1, 2021, 1 page.
Yang Fan et al: "Far-field linear optical superresolution via heterodyne detection in a higher-order local oscillator mode", OPTICA, vol. 3, No. 10, Oct. 20, 2016 (Oct. 20, 2016), p. 1148.
Journal of Physics Communications, vol. 3, No. 6, 2019, J. Grant-Jacob et al., "A neural lens for super-resolution biological imaging", See whole document, especially section 1.

* cited by examiner

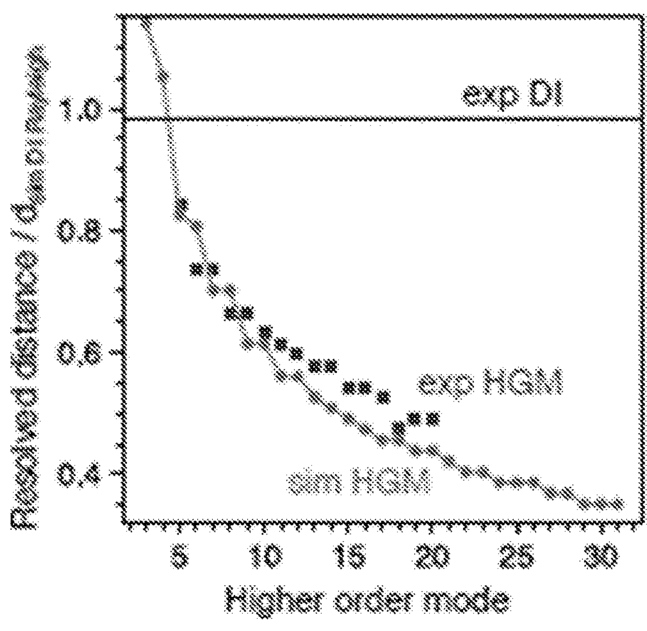
FIG. 12
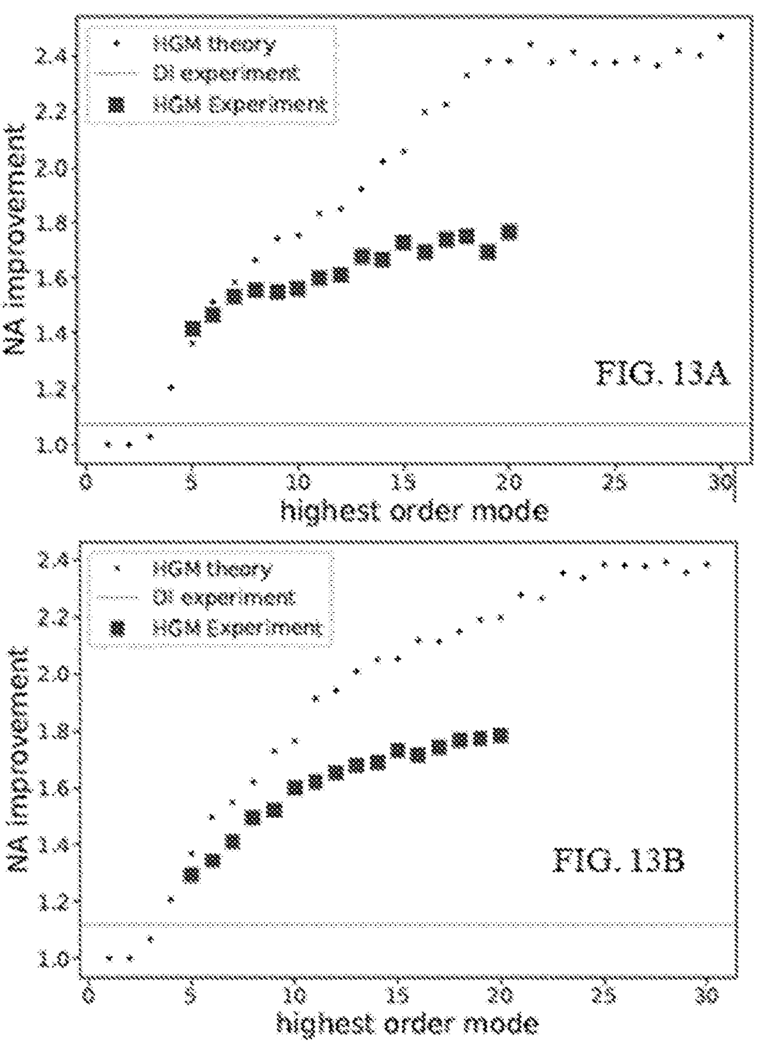
FIG. 13A
FIG. 13B

OPTICAL IMAGING

CROSS-REFERENCE TO RELATED APPLICATIONS

This application is the National Stage of International Application No. PCT/GB2022/051050, filed Apr. 26, 2022, which claims priority to GB 2106159.3, filed Apr. 29, 2021, which are entirely incorporated herein by reference.

The present invention relates to optical imaging in the far field. In particular but not exclusively, the present invention relates to super-resolution linear optical imaging in the far-field. The present invention relates to a method of training an image processing unit for use in optical imaging, a training dataset for use in optical imaging, a method of optical imaging, an imaging processing unit, and an imaging system.

In optical imaging, the light field from an object being imaged experiences diffraction as it propagates through the optical components of the imaging system. This gives rise to the smearing of the image and limits the resolution of the system. This is referred to as the diffraction limit. The diffraction limit is usually defined in terms of the heuristic Rayleigh's criterion $\theta=1.22\lambda/D$, where $\theta$ is the resolvable angular separation between two objects, $\lambda$ the wavelength of light and D the diameter of the objective lens' aperture. For optical microscopes, the diffraction limit limits the resolution to around 200 nm.

The diffraction limit is valid when objects are illuminated by classical light, the image is acquired in the far field, and the imaging processes are linear. Resolution greater than the diffraction limit (super-resolution) has been achieved with non-linear excitation of fluorophores, utilizing their distinguishability in time and near-field probing of evanescent waves. These methods however require direct interaction with the sample and/or certain nonlinear properties of the sample. Therefore, existing super-resolution imaging techniques cannot be used in certain situations, for example astronomical imaging or imaging of sensitive samples. Existing super-resolution systems are also costly to implement.

[1] M. Tsang, R. Nair, and X.-M. Lu, Quantum theory of super-resolution for two incoherent optical point sources, Phys. Rev. X 6, 031033 (2016), which is incorporated by reference, discloses a method to achieve super-resolution in the far field, with linear optics, and for standard illumination. This technique makes use of the spatial correlations of the optical field. These are ignored in conventional direct intensity measurements but contain additional information about the object. Information on the spatial correlations of the optical field is accessed by coherently processing the image field just before its detection. Therefore, this does not require any active manipulation of the sample.

One way to carry out this coherent processing is spatial mode sorting or demultiplexing of the image field, i.e., decomposing it into a basis of spatial modes, such as the Hermite-Gaussian (HG) basis, and measuring the magnitude of each component. Alternatively, heterodyne detection using a local oscillator in the different modes can be used.

Super-resolution is achieved by leveraging the fine spatial structure of these modes: since the size of their features scales with the inverse square root of the mode order, measuring the image field's projections into higher-order modes accesses increasingly finer details of the spatial distribution of the field correlations and, therefore, the sub-wavelength information they carry.

This proposal has been tested experimentally in several settings:

[2] F. Yang, A. Tashchilina, E. S. Moiseev, C. Simon, and A. I. Lvovsky, Far-field linear optical superresolution via heterodyne detection in a higher-order local oscillator mode, Optica 3, 1148 (2016).

[3] Z. S. Tang, K. Durak, and A. Ling, Fault-tolerant and finite-error localization for point emitters within the diffraction limit, Opt. Express 24, 22004 (2016).

[4] M. Pair, B. Stoklasa, Z. Hradil, L. L. Sánchez-Soto, and J. Re-hacek, Achieving the ultimate optical resolution, Optica 3, 1144 (2016).

[5] W.-K. Tham, H. Ferretti, and A. M. Steinberg, Beating Rayleigh's curse by imaging using phase information, Phys. Rev. Lett. 118, 070801 (2017).

[6] M. Parniak, S. Borówka, K. Boroszko, W. Wasilewski, K. Ba-naszek, and R. Demkowicz-Dobrza'nski, Beating the Rayleigh limit using two-photon interference, Phys. Rev. Lett. 121, 250503 (2018).

Reference [2], which is incorporated by reference, extended this technique to two-dimensional imaging. This is referred to as Hermite-Gaussian microscopy (HGM).

The advantage of HGM compared with direct imaging in terms of quantum Fisher-information formalism is discussed in the following references:

[7] M. Tsang, Subdiffraction incoherent optical imaging via spatial-mode demultiplexing, New Journal of Physics 19, 023054 (2017).

[8] M. Tsang, Quantum limit to subdiffraction incoherent optical imaging, Phys. Rev. A 99, 012305 (2019)

According to a first aspect, there is provided a method of training an image processing unit for use in optical imaging, the method comprising: providing a training object; computing a plurality of theoretically expected signals generated by detecting the component of the electromagnetic field arriving from the object in each of a plurality of different spatial modes of light; and generating a reconstructed image based on the theoretically expected signals, wherein the reconstructed image is provided as a label for the training object for use in training the image processing unit.

The method may further comprise: generating a plurality of measured signals by detecting the component of the electromagnetic field arriving from the object in each of a plurality of different spatial modes of light; and associating the label with the plurality of measured signals.

The method may further comprise: using the image processing unit to construct an image from the measured signals in each of the plurality of different spatial modes of light by applying an image processing algorithm; comparing the output of the image processing unit to the training label; and updating the image processing algorithm based on the comparison.

The amplitudes of the measured signals may be provided as inputs to the image processing unit.

The method may further comprise: determining the phases of the measured signals and providing the phase as an input to the image processing unit with the amplitudes.

The image processing unit may comprise a neural network having: an input layer arranged to receive the measured signals; an output layer arranged to provide the image constructed from the detected photocurrents; and one or more hidden layers between the input layer and output layer, wherein the neural network is arranged to perform the image processing algorithm by applying weights and activation functions to the measured signals, to generate an output; and wherein the weights and activation functions are updated based on the comparison.

For each of the plurality of different spatial modes of light, the measured signal may be measured by heterodyne detection, using a coherent or incoherent monochromatic light source to illuminate the object and a local oscillator in the spatial mode of light, wherein the signals arriving from the object are reflected signals.

The method may further comprise: splitting an output of the light source to provide the local oscillator and the light for illuminating the training object.

The measured signals may be detected by spatial demultiplexing of the electromagnetic field arriving form the object into the plurality of different spatial modes of light.

When the measured signals are detected using heterodyne detection, the theoretically expected signals may be generated based on the use of heterodyne detection. When the measured signals are detected using spatial demultiplexing, the theoretically expected signals may be generated based on spatial demultiplexing.

The different spatial modes of light may be transverse electromagnetic modes. The spatial modes of light may be Hermite-Gaussian modes or Zernike modes. The different spatial modes of light may form an orthogonal set of modes of light.

The plurality of different spatial modes of light may include at least 25 modes of light. The plurality of different spatial modes of light may include at least 200 modes of light. The plurality of different spatial modes of light may include at least 300 modes of light. The plurality of different spatial modes of light may include at least 400 modes of light or more.

The training object may comprise an image of an article having nanoscale features and predefined structure.

The method may further comprise: generating a plurality of different training objects using images of the same article in different positions and/or orientations.

The training object may comprise a bitmap image. The bitmap image may comprise a random pattern or combination of simple geometric shapes.

According to a second aspect, there is provided a training dataset for use in optical imaging, the training dataset comprising, for each of a plurality of training objects: a label; and a plurality of measured signals, the label and measured signal generated according to the first aspect.

According to a third aspect, there is provided a method of optical imaging comprising: for a plurality of different spatial modes of light, detecting the component of the electromagnetic field arriving from an object in each of a plurality of different spatial modes of light; and generating an image using an image processing unit trained in accordance with the method of the first aspect.

The component of the electromagnetic field arriving from the object in each of the plurality of different spatial modes of light may be detected by one of: heterodyne detection using a local oscillator; or demultiplexing.

When the component of the electromagnetic field arriving from the object in each of a plurality of different spatial modes of light is detected by heterodyne detection using a local oscillator, the image processing unit may be trained using heterodyne detection using a local oscillator. When the component of the electromagnetic field arriving from the object in each of a plurality of different spatial modes of light is detected by demultiplexing the image processing unit may be trained using demultiplexing.

According to a fourth aspect, there is provided an image processing unit trained in accordance with the method of any of the first aspect.

According to a fifth aspect, there is provided an optical imaging system comprising: a detector system for detecting light reflected from or emitted from an object, the detector system arranged to detect the component of the electromagnetic field in each of a plurality of different spatial modes of light; and an image processing unit trained in accordance with the method of the first aspect, the image processing unit arranged to process the detected signals to construct an image of the object.

The detection system may be a heterodyne detection system or a spatial demultiplexing system.

According to a sixth aspect, there is provided a machine-readable computer medium containing instructions which when read by a machine cause that machine to perform the method of the first aspect or the third aspect.

The machine readable medium referred to may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to one of the above aspects of the invention may be applied, mutatis mutandis, to the other aspect of the invention. Further, the features described may be applied to the or each aspect in any combination.

According to at least some of the various aspects of the invention, the image processing unit is trained using a computed label rather than the ground truth training object.

Therefore, the image processing unit is trained to approximate the underlying HGM model and filter out the experimental noise, and not to guess the sample features beyond the resolution capabilities of the optics. This reduces overfitting issues that degrade the imaging quality. HGM is a simpler and cheaper alternative to many existing super-resolution methods.

Furthermore, its passive nature permits universal application in a wide variety of imaging scenarios, including those not accessible by existing schemes.

Embodiments of the invention will now be described, by way of example only, with reference to the accompanying drawings, in which;

FIG. 1 schematically illustrates an optical imaging system;

FIG. 2 illustrates examples of spatial light modulator holograms used to produce HG modes;

FIG. 3 schematically illustrates an example of feedforward neural network used to construct the images from the signals measured in the system of FIG. 1;

Figure 8A:
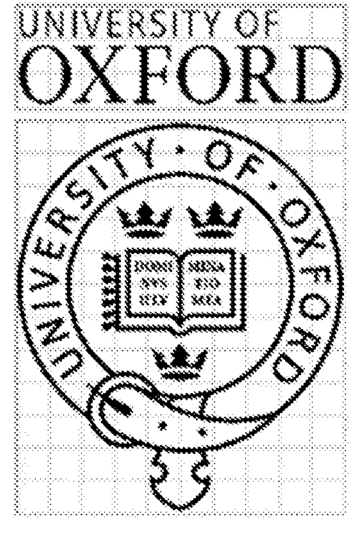
Figure 8B:
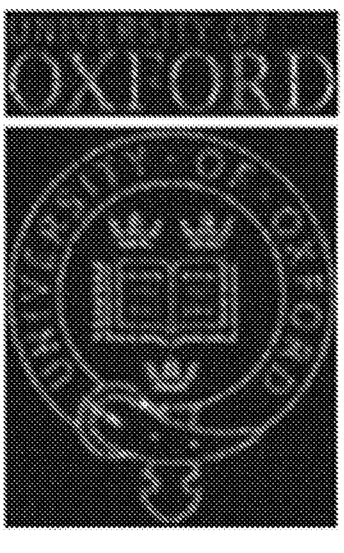
Figure 8C:
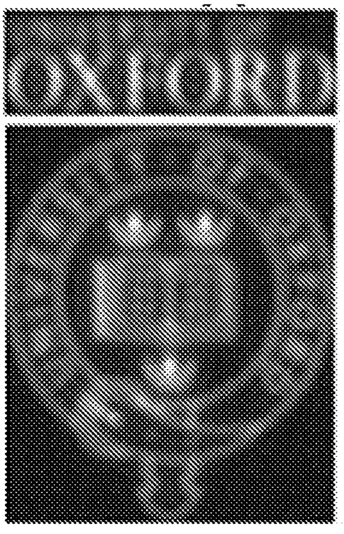
Figure 9A:
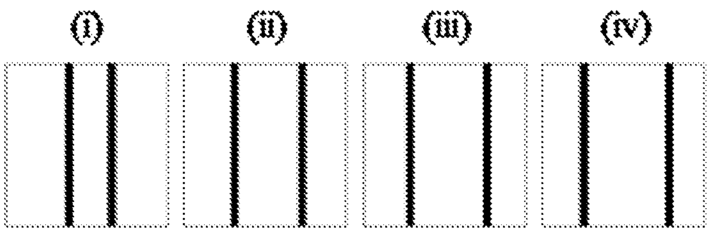
Figure 9B:
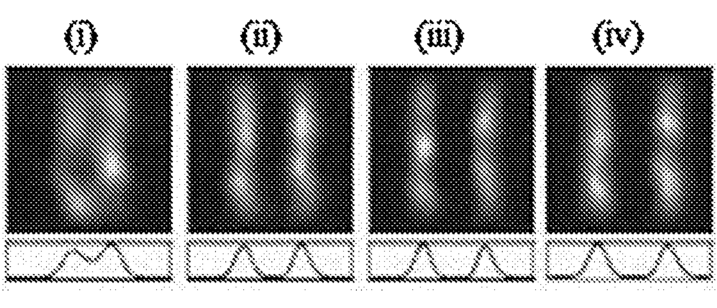
Figure 9C:
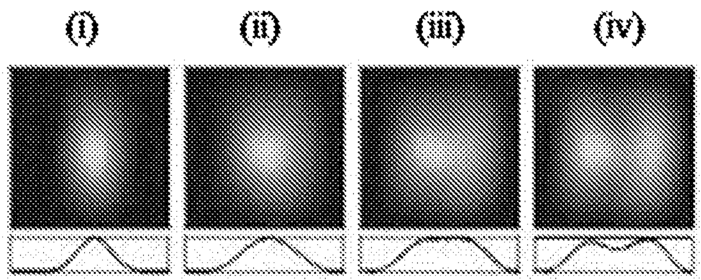
Figure 10A:
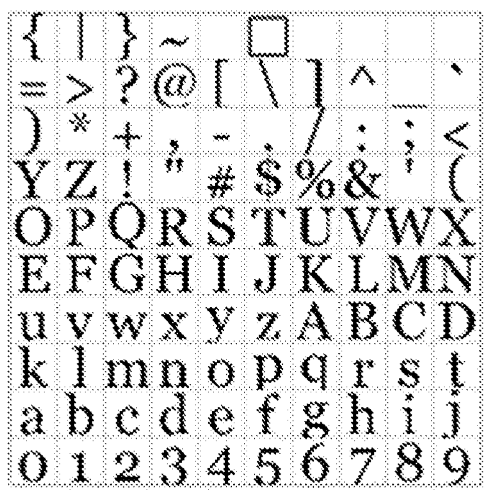
Figure 10B:
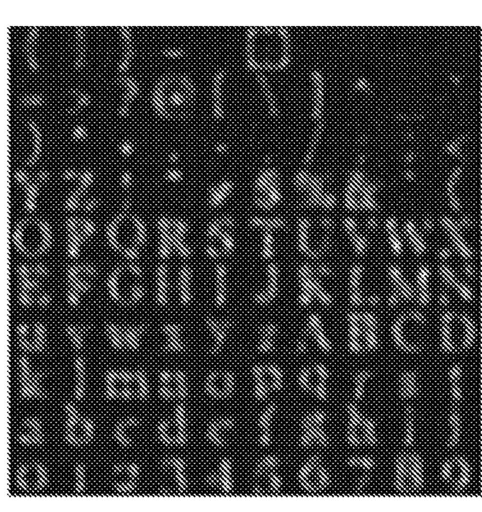
Figure 10C:
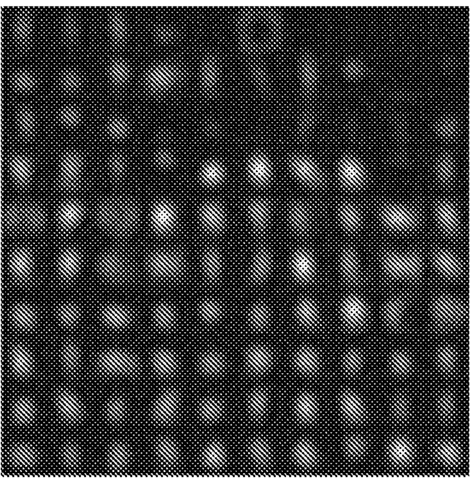
Figure 11A:
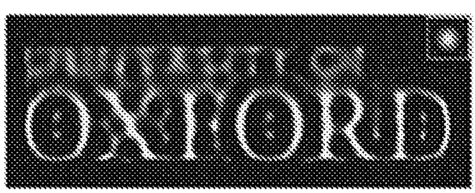
Figure 11B:
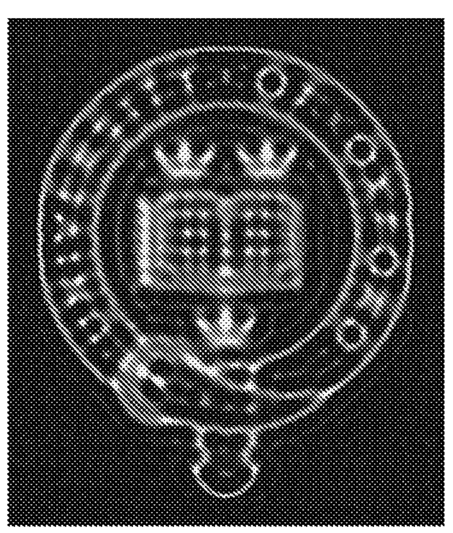
Figure 11C:
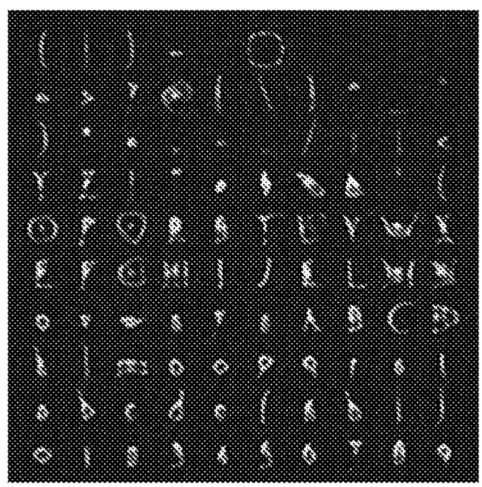
Figure 13C:
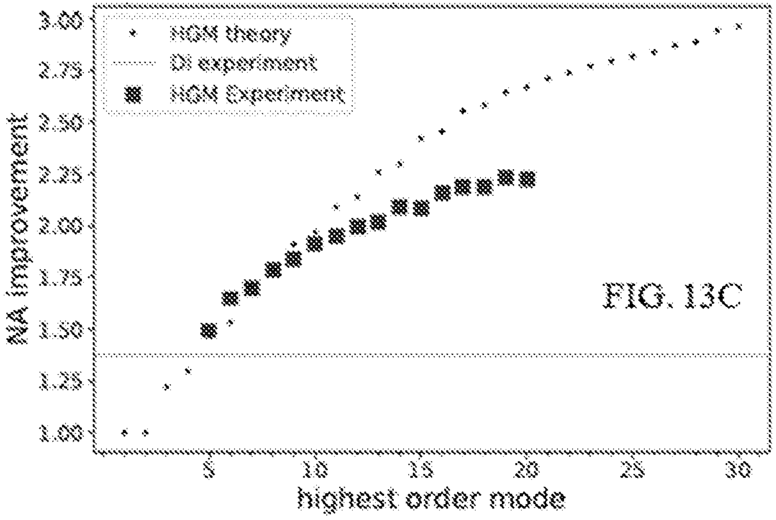
Figure 14:
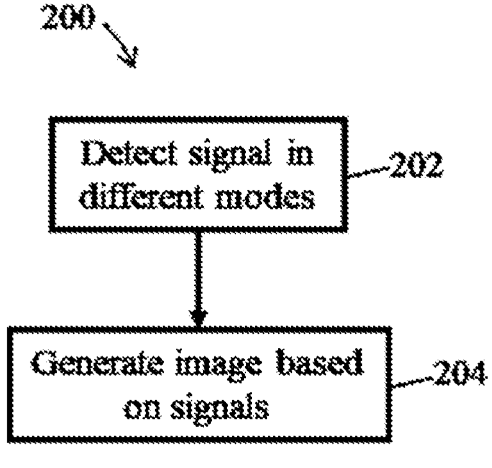

FIGS. 8A to C show the original object, the HGM reconstruction and the direct imaging result of a first test object;

FIGS. 9A to C show the original object, the HGM reconstruction and the direct imaging result of a second test object;

FIGS. 10A to C show the original object, the HGM reconstruction and the direct imaging result of a third test object;

FIGS. 11A and B show the direct imaging result of FIG. 8C with further post processing;

FIG. 11C shows the direct imaging result of FIG. 10C with further post processing;

FIG. 12 shows the HGM resolution achieved as a function of the number of HG modes used in both dimensions;

FIGS. 13A to C shows HGM resolution achieved as a function of the number of HG modes used in both dimensions, using a different quantitive measure; and FIG. 14 illustrates a method of optical imaging.

In the figures, like reference numerals are used to reference like components.

Figure 1:
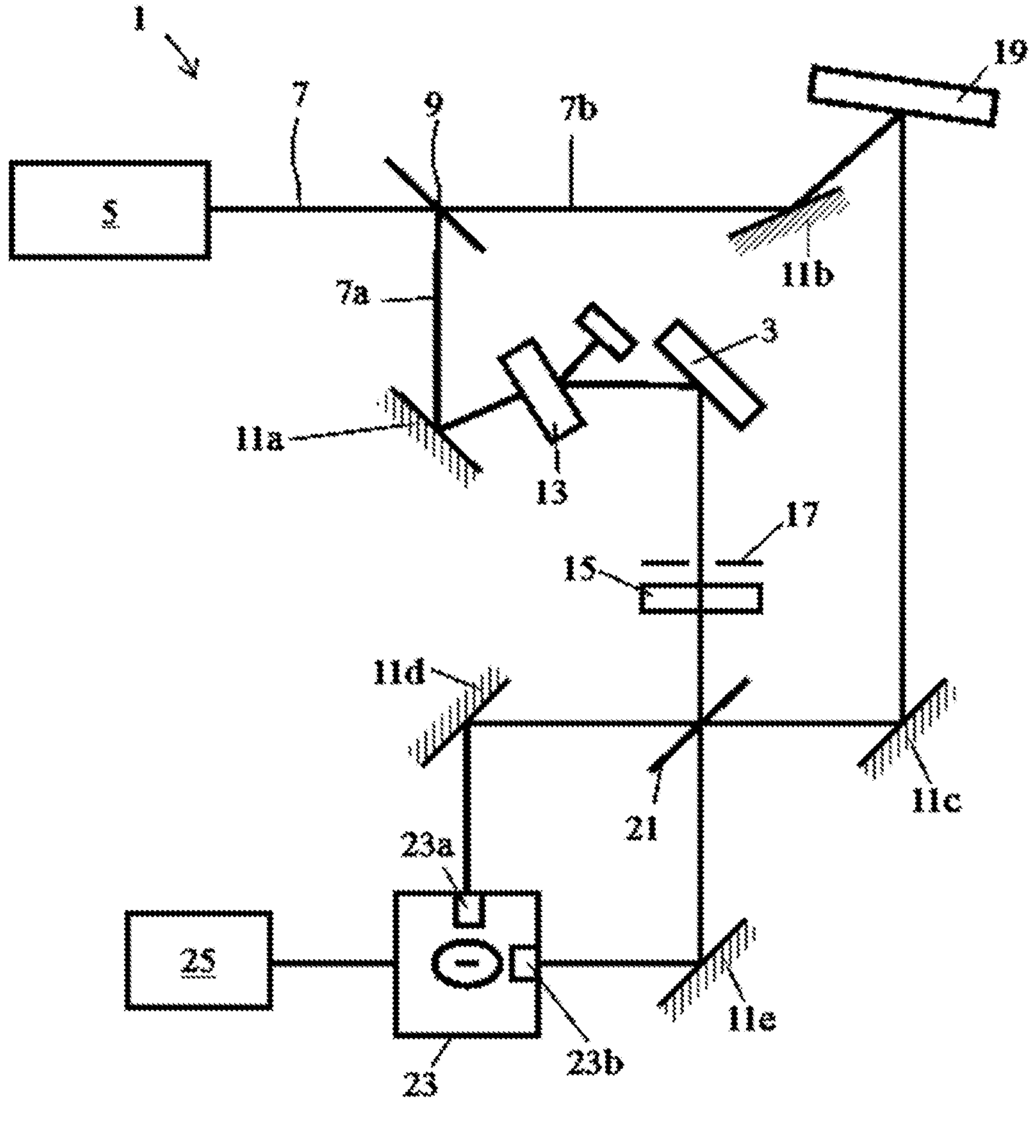

FIG. 1 schematically illustrates an optical imaging system 1 for capturing images of an object 3 in a way that makes use of the optical field's spatial correlations to achieve super-resolution. By way of example, the imaging system 1 will be described in the context of heterodyne detection, however, as discussed below, other detection techniques can also be used.

In the example of FIG. 1, the imaging system 1 includes a light source 5 emits a beam of light 7. The beam 7 is split into two portions 7$a$, 7$b$ by a beam splitter 9. A first portion 7$a$ of the beam forms a signal branch and a second portion 7$b$ forms a local oscillator (LO) branch. In this example, the beam splitter is a 50/50 beam splitter, such that there is equal intensity in each branch 7$a$, 7$b$ however, this need not necessarily be the case.

It will be appreciated that both the signal branch 7$a$ and LO branch 7$b$ may include mirrors 11$a$, 11$b$, 11$c$ to direct the light along the correct path. The mirrors 11$a$, 11$b$, 11$c$ are given by way of example only and are provided to achieve the specific spatial arrangement of the components shown. Any suitable mirrors or reflectors can be used in any arrangement to achieve the desired path. In addition, further optical components, such as lenses, may be provided to direct or focus the signal as desired. These are not shown for clarity.

An acoustic optical modulator 13 is provided in the signal branch 7$a$, to frequency-shift the signal before illuminating the object 3. The light reflected from the object 3 is imaged by an objective lens 15. The objective lens 15 may have an iris 17 provided in front of it to reduce the numerical aperture of the lens 15.

In the LO path 7$b$, the beam is shaped into a Hermite Gaussian ($HG_{m,n}$) mode by a liquid-crystal spatial light modulator 19 (SLM), where m and n are integers reflecting the order of the mode in the x and y directions (where the z direction is defined by the direction of travel of the beam).

The SLM 19 has an array of pixels that can be switched to form different patterns. The SLM 19 modulates the phase of an incoming optical wave by controlling the effective refractive index of the liquid crystal layer in each of its pixels. In order to generate Hermite-Gaussian modes, a phase grating ("hologram") hologram is displayed on the SLM screen. Setting the grating's depth and offset at each point of the SLM surface allows any desired complex spatial profile in the first order of diffraction in the reflected wave to be generated.

When computing the hologram, the incoming beam's non-uniform profile and the SLM backplane curvature is compensated for using the procedure described in [9] A. Pushkina, J. Costa-Filho, G. Maltese and A. Lvovsky, Comprehensive model and performance optimization of phase-only spatial light modulators, Meas. Sci. Technol. 31 125202 (2020), the contents of which are incorporated by reference. The holograms can be modified further to alter the waist, displacement, and orientation of the generated modes.

Figures 2A, 2B, 2C, 2D, 2E, 2F:
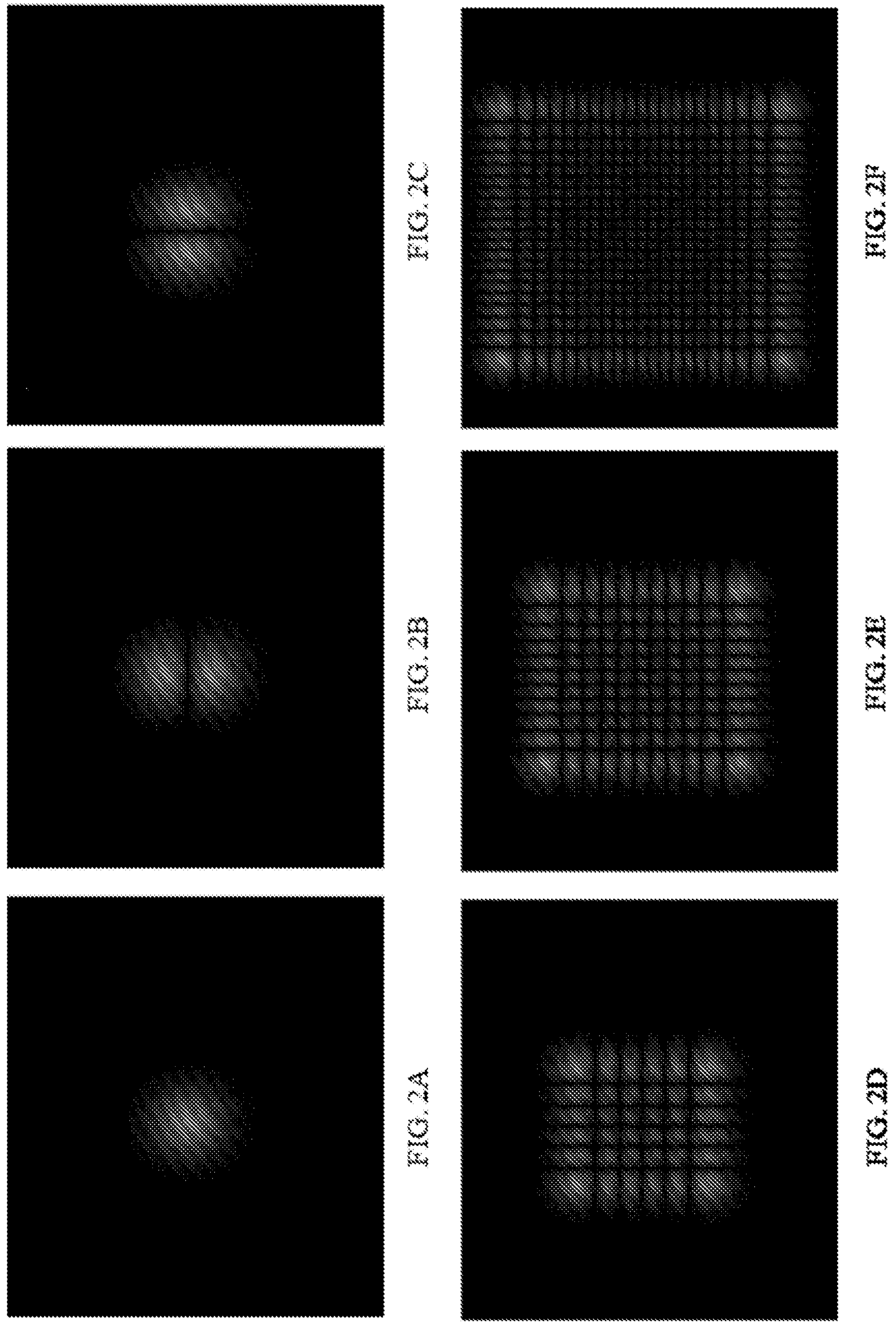

FIG. 2 illustrates examples of SLM holograms used to produce HG modes. (A) $HG_{0,0}$, (B) $HG_{0,1}$, (C) $HG_{1,0}$, (D) $HG_{5,5}$, (E) $HG_{10,10}$, (F) $HG_{20,20}$. The SLM holograms required to produce other modes will be apparent to the person skilled in the art.

The signal path 7$a$ and LO path 7$b$ are recombined at 50:50 beam splitter 21 for heterodyne detection. Again, mirrors 11$d$, 11$e$ are provided to properly direct the beams output from the beam splitter 21, but these are shown by way of example only. In the example shown balanced heterodyne detection is used. Photodetectors 23$a$, 23$b$ on each output of the beam splitter 21 are detected and a difference determined by the balance detector 23. The resultant signal is detected by detector 25, such as an oscilloscope. The signal is demodulated, and the phase and amplitude are recorded.

The SLM 19 is sequentially swept through a number of different $HG_{n,m}$, for different values of m and n. The amplitude and phase in each mode is measured and recorded as above, to provide measured signals. In one example, modes may be generated for n,m=0 to 20, providing 441 modes.

The detected signals can be used to generate an image of the object 3. To describe the image construction from the measured amplitude and phases, the case of two separate point sources is first considered. This is then scaled to a one-dimensional case, and then the two-dimensional case.

According to Abbe's microscope resolution theory:

$$\tilde{E}(k_\perp) = \int_{-\infty}^{+\infty} E(x) e^{ik_\perp x} dx, \tag{1}$$

Where $\tilde{E}$ is the electric field at the image plane, E is the electric field at the object plane and $k_\perp$ is the orthogonal component of the wavevector and constant normalization factors are neglected through the calculation.

In the general case, where the objective lens of the imaging system/microscope is located in the far-field at distance L from the object plane, the position X of the lens plane is then related to $k_\perp$ according to equation 2:

$$X = L\frac{k_\perp}{k} = \frac{L\lambda k_\perp}{2\pi}. \tag{2}$$

The lens, in turn generates the inverse Fourier image in its focal plane:

$$\begin{aligned} E'(x') &= \frac{1}{2\pi} \int_{-\infty}^{+\infty} \tilde{E}(k_\perp) \tilde{T}(k_\perp) e^{-ik_\perp x'} dk_\perp \\ &= \frac{1}{2\pi} \int_{-\infty}^{+\infty} \int_{-\infty}^{+\infty} E(x) \tilde{T}(k_\perp) e^{-ik_\perp (x-x')} dx dk_\perp, \end{aligned} \tag{3}$$

$\tilde{T}(k_\perp)$ is the transmissivity of the lens as a function of the transverse position in its plane. If this transmissivity is constant, corresponding to an infinitely wide lens, the image is identical to the objet E'(x')=E(x). If the lens is of finite width, the image is distorted according to equation 4, which gives the field distribution in the image plane:

$$E'(x') = \int_{-\infty}^{+\infty} E(x)T(x'-x)dx, \tag{4}$$

$$\text{Where: } T(x'-x) = \frac{1}{2\pi}\int_{-\infty}^{+\infty} \tilde{T}(k_\perp)e^{ik_\perp(x-x')}dk_\perp$$

Is the Fourier image of the lens. In other words, the image is a convolution of the object with T(•) (which is the transfer function of the objective lens). In the below, the magnification is assumed to be unity for convenience.

The transfer function can be approximated by a Gaussian as shown in equation 5:

$$T(x) \approx \frac{1}{(2\pi)^{1/4}\sqrt{\sigma}}e^{-x^2/4\sigma^2}, \tag{5}$$

With the width $\sigma \approx 0.21\lambda/NA$.

As can be seen from equation 5, the narrower the aperture in the lens, the wider the transfer function and the stronger the distortion of the image. The heterodyne detector generates a current J that is proportional to the overlap between the LO and the signal field, as shown in equation 6:

$$J \propto \int_{-\infty}^{+\infty} E'(x')E_{LO}^*(x')dx', \tag{6}$$

Where $E_{LO}(x')$ is the spatial profile of the LO.

If the field E(x) is coherent, equation 6 is sufficient to calculate the output signal.

If the object is incoherent, the average of the signal over all realizations of E(x) must be taken to find the output power of the heterodyne detector photocurrent, as shown in equation 7:

$$\langle P\rangle \propto \left\langle\left|\int_{-\infty}^{+\infty} E'(x')E_{LO}^*(x')dx'\right|^2\right\rangle = \iint_{-\infty}^{+\infty}\langle E'(x')E'^*(x'')\rangle E_{LO}^*(x')E_{LO}(x'')dx'dx'' \tag{7}$$

Using equation 4:

$$\langle E'(x')E'^*(x'')\rangle = \iint_{-\infty}^{+\infty}\langle E(x_1)e^*(x_2)\rangle T(x'-x_1)T^*(x''-x_2)dx_1dx_2. \tag{8}$$

For an incoherent object:

$$\langle E(x_1)E^*(x_2)\rangle \propto I(x_1)\delta(x_1-x_2), \tag{9}$$

$$\text{Therefore: } \langle P\rangle \propto \iiint_{-\infty}^{+\infty} I(x)T(x'-x)T^*(x''-x)\times E_{LO}(x')E_{LO}^*(x'')dxdx'dx''. \tag{10}$$

The heterodyne detector signal is determined as a function of the object configuration. In the case of a coherent light source this is E(x) and in the case of an incoherent light source, this is I(x). To simplify the calculations, the transmissivity function is assumed to be a top hat $T(k_\perp)=\theta(k_{\perp max}-|k|)$. From equation 2, $k_{\perp max}=2\pi R/(L\lambda)$ where R is the radius of the iris and θ(•) is the Heaviside step function. In the Fourier domain, this translates to:

$$T(x'-x) \propto \frac{\sin(k_{\perp max}(x-x'))}{k_{\perp max}(x-x')} \approx e^{-(x-x')^2/4\sigma^2}, \tag{11}$$

In two dimensions, the transmissivity function is given by the first-order Bessel function whose Gaussian approximation is similar.

For a point source located at a position x=0 along the x axis, the LO field in $HG_{00}$ is optimised to match the mode E(x') in the coherent case for $E(x)\propto\delta(x)$. Therefore:

$$E_{LO}(x') \propto e^{-x'^2/4\sigma^2}$$

In the $HG_{01}$ mode:

$$E_{LO}(x') \propto x'e^{-x'^2/4\sigma^2}$$

Substituting this into equation 5, the power for the case of a coherent light source is given by equation 12:

$$P \propto J^2 \propto \left(\int_{-\infty}^{+\infty} xE(x)e^{-x^2/8\sigma^2}\right)^2 dx. \tag{12}$$

For the case of an incoherent light source, the mean power signal (given by equation 10) is given by:

$$\langle P\rangle \propto \int_{-\infty}^{+\infty} x^2 I(x)^{-x^2/4\sigma^2}dx. \tag{13}$$

For a point source at position $x_p$ (≠0) along the x axis so that $E(x)\propto\delta(x-x_p)$, the current is given by equation 14 (for a coherent light source):

$$J_p(x_p) \propto \int_{-\infty}^{+\infty} T(x'-x_p)E_{LO}^*(x')dx', \tag{14}$$

For a Gaussian transfer function, equation 14 reduces to:

$$J_p(x_p) \propto \frac{1}{2\sigma} x_p e^{-x_p^2/8\sigma^2},$$

Therefore, the corresponding electronic power is given by:

$$P(x_p) \propto J_p^2(x_p) \propto \frac{1}{4\sigma^2} x_p^2 e^{-x_p^2/4\sigma^2}, \tag{15}$$

The signal given by this equation vanishes at $x_p=0$

For the case of two point sources at $x=\pm d/2$, such that the points are separated by a distance d, the signal is given by $P(d/2)+P(-d/2)$ in $HG_{01}$, which is proportional to $d^2$ in the leading order.

As discussed above, the use of the $HG_{01}$ mode can estimate the distance between two point light sources, where it is known that the sources are identical. Measuring in higher HG modes permits reconstruction of the full object.

For HG modes varying in one dimension, equation 6 can be generalised to $$J_{0n} \propto \int_{-\infty}^{+\infty} E(x) J(x) dx, \tag{16}$$

Where J(x) is the photocurrent in response to a point source at x (equation 14).

It is again assumed that the transfer function is given by equation 5, while the LO is in $HG_{0n}$ of width σ. Therefore:

$$E_{LO,n}(x) \propto \frac{H_n(x/\sqrt{2}\sigma)}{(2\pi)^{1/4}\sqrt{2^n n!\sigma}} e^{-x^2/4\sigma^2}, \tag{17}$$

Where H(•) is the Hermite polynomials.

Therefore, the integral of equation 14 corresponds to a Weierstrass transform of the Hermite polynomial, and is given by equation 18:

$$J_{p,0n}(x) \propto \frac{1}{\sqrt{n!}} \left(\frac{x}{2\sigma}\right)^n e^{-x^2/8\sigma^2}. \tag{18}$$

Therefore, for objects of size ≲σ, the photocurrent $J_{0n}$ gives the nth moment of the field in the object plane.

The set of photocurrents acquired for multiple modes can be further utilized to find the decomposition of E(x) into the Hermite-Gaussian basis and thereby reconstruct the full image of the object with a sub-Rayleigh resolution. Let $\alpha_{kn}$, be the coefficients of the Hermite polynomial of degree k, so that:

$$H_k(x/2\sigma) = \sum_n \alpha_{kn} (x/\sigma)^n.$$

From equations 16 and 18:

$$\beta_k := \sum_n \sqrt{n!}\,\alpha_{kn} J_{0n} = \int_{-\infty}^{+\infty} E(x) H_k\left(\frac{x}{2\sigma}\right) e^{-x^2/8\sigma^2} dx. \tag{19}$$

Hermite-Gaussian functions form an orthogonal basis in the Hilbert space of one-dimensional functions. Therefore, it follows that:

$$E(x) \propto \sum_{k=0}^{\infty} \frac{\beta_k H_k(x/2\sigma) e^{-x^2/8\sigma^2}}{2^{k+1} k! \sqrt{\pi}\,\sigma}. \tag{20}$$

Knowing all values of $\beta_k$, E(x) can be determined.

This approach can be scaled to two dimensions, by scanning over both n and m for $HG_{mn}$ and measuring the photocurrent $J_{nm}$ for each mode. Acquiring both sine and cosine quadratures of the heterodyne photocurrent permits phase-sensitive reconstruction of the field (coherent imaging). For a coherent light source, the heterodyne photocurrent is given by:

$$J_{mn} \propto \frac{1}{\sqrt{m!n!}} \iint_{-\infty}^{\infty} E(x, y) \left(\frac{x}{2\sigma}\right)^m \left(\frac{y}{2\sigma}\right)^n e^{-(x^2+y^2)/8\sigma^2} dx dy \tag{21}$$

where E(x,y) is the transverse field profile of the object; both the field and the current are complex in this case, i.e. they comprise both the amplitude and the phase.

Analogous to equation 19, for two dimensions:

$$\beta_{kl} = \sum_{m,n=0}^{\infty} \sqrt{m!n!}\,\alpha_{km}\alpha_{ln} J_{mn} = \iint_{-\infty}^{+\infty} E(x, y) H_k\left(\frac{x}{2\sigma}\right) H_l\left(\frac{y}{2\sigma}\right) e^{-(x^2+y^2)/8\sigma^2} \tag{22}$$

It therefore follows that, for the two-dimensional case, with a coherent light source:

$$E(x, y) \propto \sum_{k,l=0}^{\infty} \frac{\beta_{kl} H_k\left(\frac{x}{2\sigma}\right) H_l\left(\frac{y}{2\sigma}\right) e^{-(x^2+y^2)/8\sigma^2}}{2^{k+l+2} k! l! \pi\sigma^2} \tag{23}$$

For the incoherent cases, equation 9 is used to write the output power of the heterodyne detector as:

$$\langle P_{0n} \rangle \propto \langle J_{0n}^2 \rangle = \iint_{-\infty}^{+\infty} \langle E(x_1) E(x_2) \rangle J(x_1) J(x_2) dx_1 dx_2 = \int_{-\infty}^{+\infty} I(x) J^2(x) dx. \tag{24}$$

Substituting equation 18 into equation 24:

$$\langle P_{on} \rangle \propto \frac{1}{n!} \int_{-\infty}^{+\infty} I(x) \left(\frac{x}{2\sigma}\right)^{2n} e^{-x^2/4\sigma^2} \tag{25}$$

The image in one dimension, with an incoherent light source is then given by $$I(x) \propto \sum_{k=0}^{\infty} \frac{\beta_{2k} H_{2k}\left(\frac{x}{\sqrt{2}\sigma}\right) e^{-x^2/4\sigma^2}}{2^{2k}(2k)!\sqrt{2\pi\sigma^2}}, \tag{26}$$

Where:

$$\beta_{2k} = \sum_{n=0}^{\infty} 2^n n! \alpha_{2k,2n} P_n. \tag{27}$$

Similar to the coherent case, the moments of the field distribution are obtained in the object plane. However, only the even coefficients of the decomposition of I(x) into the Hermite-Gaussian basis are obtained. Therefore, the information about only the even component of function I(x) is retained. An image reconstructed with these data will be a sum of the original intensity profile I(x) with the collateral image I(−x).

For two-dimensional microscopy, the power of the signal in the incoherent case is given by:

$$P_{mn} \propto \frac{1}{m!n!} \int\int_{-\infty}^{\infty} I(x, y) \left(\frac{x}{2\sigma}\right)^{2m} \left(\frac{y}{2\sigma}\right)^{2n} e^{-(x^2+y^2)/4\sigma^2} dx dy \tag{28}$$

The reconstructed image in two-dimensions, with an incoherent light source is then given by:

$$I(x, y) \propto \sum_{k,l=0}^{\infty} \frac{\beta_{2k,2l} H_k\left(\frac{x}{\sqrt{2}\sigma}\right) H_l\left(\frac{y}{\sqrt{2}\sigma}\right) e^{-(x^2+y^2)/4\sigma^2}}{2^{2k+2l+1}(2k)!(2l)!\pi\sigma^2} \tag{29}$$

Where $$\beta_{2k,2l} = \sum_{n=0}^{\infty} 2^{m+n} m! n! \alpha_{2k,2m} \alpha_{2l,2n} P_{mn} \tag{30}$$

In this case, three collateral images, I(x, −y), I(−x, y), and I(−x, −y), will be added to the original image I($_x$, y). Their effect can be eliminated by placing the entire object in a single quadrant of the x-y plane.

The image is constructed from the measured photocurrents using an image processing unit. Image reconstruction using the above relies on precise knowledge of the point spread function and is sensitive to even the experimental imperfections. The sources of errors can be manifold: imperfect HG modes, phase aberrations in both beams' paths, the curvature of the object, hardness and asymmetry of the aperture, and the misalignment between the HG modes and the signal beam, among others.

Figure 3:
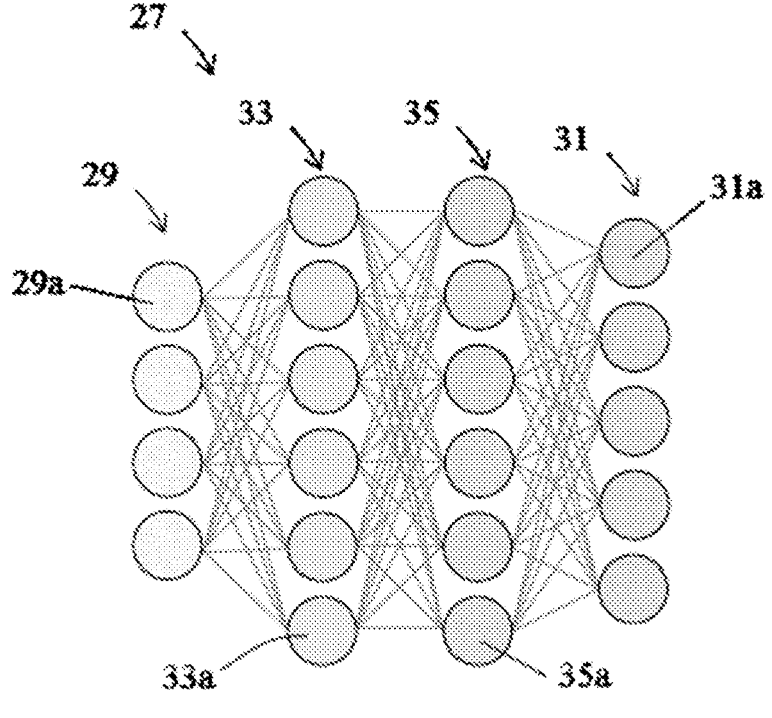

In one example, the image processing unit may be in the form of a neural network (NN). FIG. 3 schematically illustrates an example of feedforward NN 27 used to construct the images from the measured signals in a way that address these errors. As discussed below, each layer 29, 31, 33, 35 of the NN 27 may have any number of units 29*a*, 31*a*, 33*a*, 35*a*. However, for the sake of clarity only a limited number are shown in FIG. 3.

The NN shown in FIG. 3 comprises an input layer 29 arranged to receive the detected photocurrents. For coherent imaging, both the amplitude (or absolute value) and phase of the signal are input. whilst for incoherent imaging, only the amplitude is used. Thus, for imaging using N different modes, the input layer 29 comprises 2N input units 29*a* for coherent imaging and N units 29*a* for incoherent imaging. The input of the NN accepts real valued variables only. Therefore, the input is normalized to range from −1 to 1 for coherent imaging and 0 to 1 for incoherent imaging.

The NN 27 also comprises an output layer 31. The output from this layer is a pixel image, with each output unit 31*a* corresponding to a pixel in the image. Therefore, for example, for a 50×50 pixel output, the output layer 31 includes 2,500 units 31*a*.

Between the input layer 29 and the output layer 31, the NN 27 shown in FIG. 3 includes two hidden layers 33, 35, each having 6000 units 33*a*, 35*a*.

As schematically illustrated in FIG. 3, each unit 29*a* of the input layer 29 is connected to the input of each unit 33*a* in the first hidden layer 33. Similarly, the output of each unit 33*a* in the first hidden layer 33 is coupled to the input of each unit 35*a* in the second hidden layer 35, and the output of each unit 35*a* in the second hidden layer is coupled to each unit 31*a* in the output layer 31.

Between layers 29, 31, 33, 35, a weighting matrix is applied to the signals passing through the network 27. Each connection between different pairs of units may have an independently tuneable weight. Each unit 33*a*, 35*a* of the hidden layers 33, 35 also applies an activation function to the signals passing through the network 27. In the example being discussed, the hyperbolic tangent (tan h) is used as the activation function for the first hidden layer 33 and a ReLU activation function is used for the second hidden layer 35, however it will be appreciated that any suitable function may be used. After the second hidden layer 35, a sigmoid function may be used, in order to adapt to the range of the labels.

FIGS. 4A, 4B and 5A to 5D illustrate a method of training the NN 27 to accurately construct the image based on the detected photocurrents.

In order to train the neural network 27, detected photocurrents measured for a plurality of sample images (also referred to as training objects) are provided to the NN 27. The photocurrents are processed by the NN 27 to construct an output image, which is then compared to a label associated with the training image. The variance between the label and output image is used to modify the weights and/or activation functions. This process is repeated iteratively to ensure the output from the NN 27 matches the label.

Various algorithms and approaches for training NNs 27 will be known to the person skilled in the art, and any suitable method may be used.

Figures 4A, 4B:
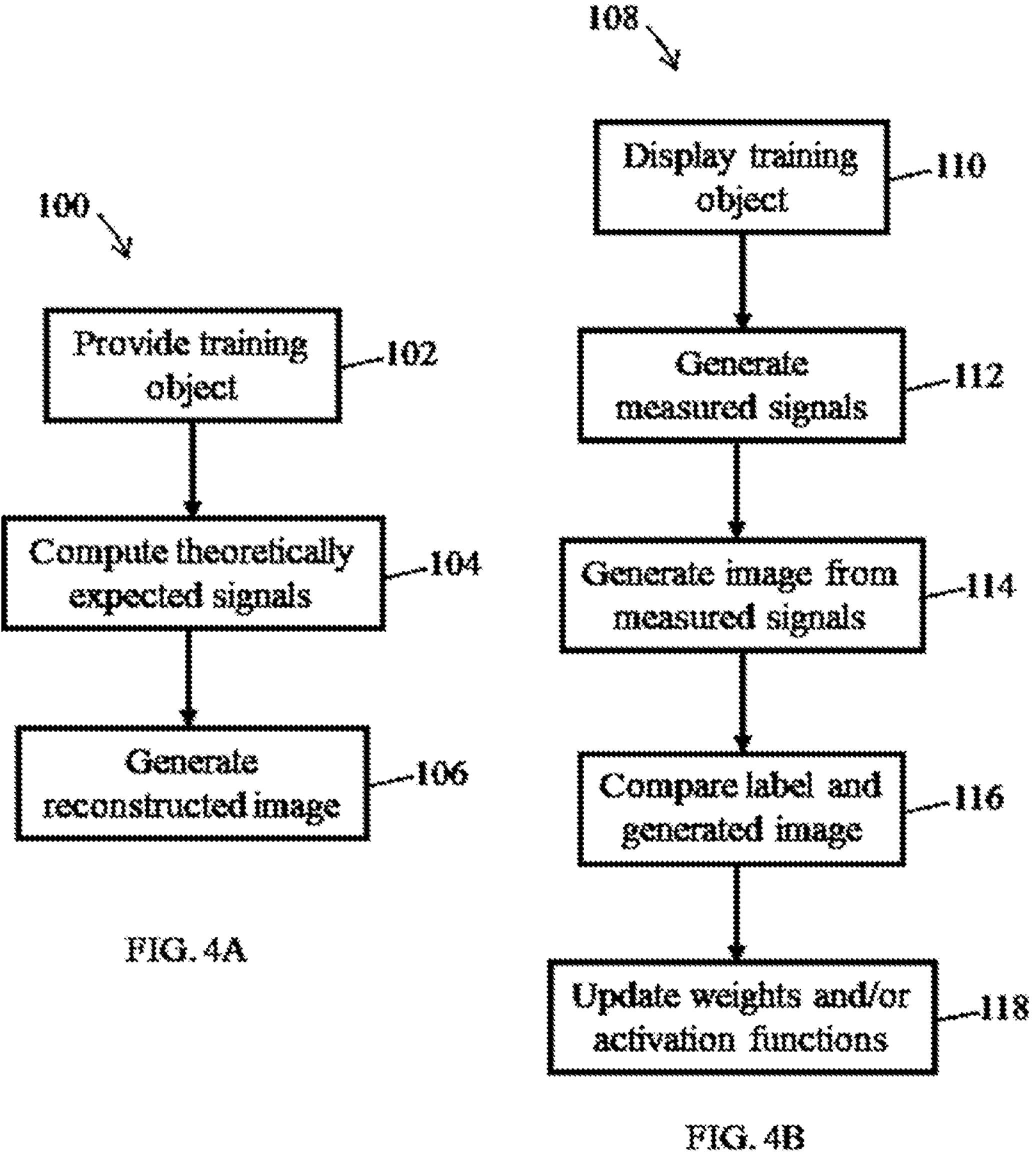
FIG. 4A illustrates a first part of a method for training the neural network—the method for generating labels for training data to train the neural network of FIG. 3.
FIG. 4B illustrates the second part of the method for training the neural network.

As a first part of the method for training the NN, the labels are generated for the training objects. FIG. 4A illustrates the method 100 for generating the labels. It will be appreciated that this may be applied to one or more training objects at a time.

At a first step 102 a training object 37 is provided.

In one example, the object 3 in the imaging system may be a digital mirror device (DMD) arranged to display an image. The DMD contains an array of micromirrors which can be switched between the ON or OFF state, corresponding, respectively, to a tilt in opposite directions along their diagonal axis and relative to their flat position.

Figures 5A, 5B, 5C, 5D:
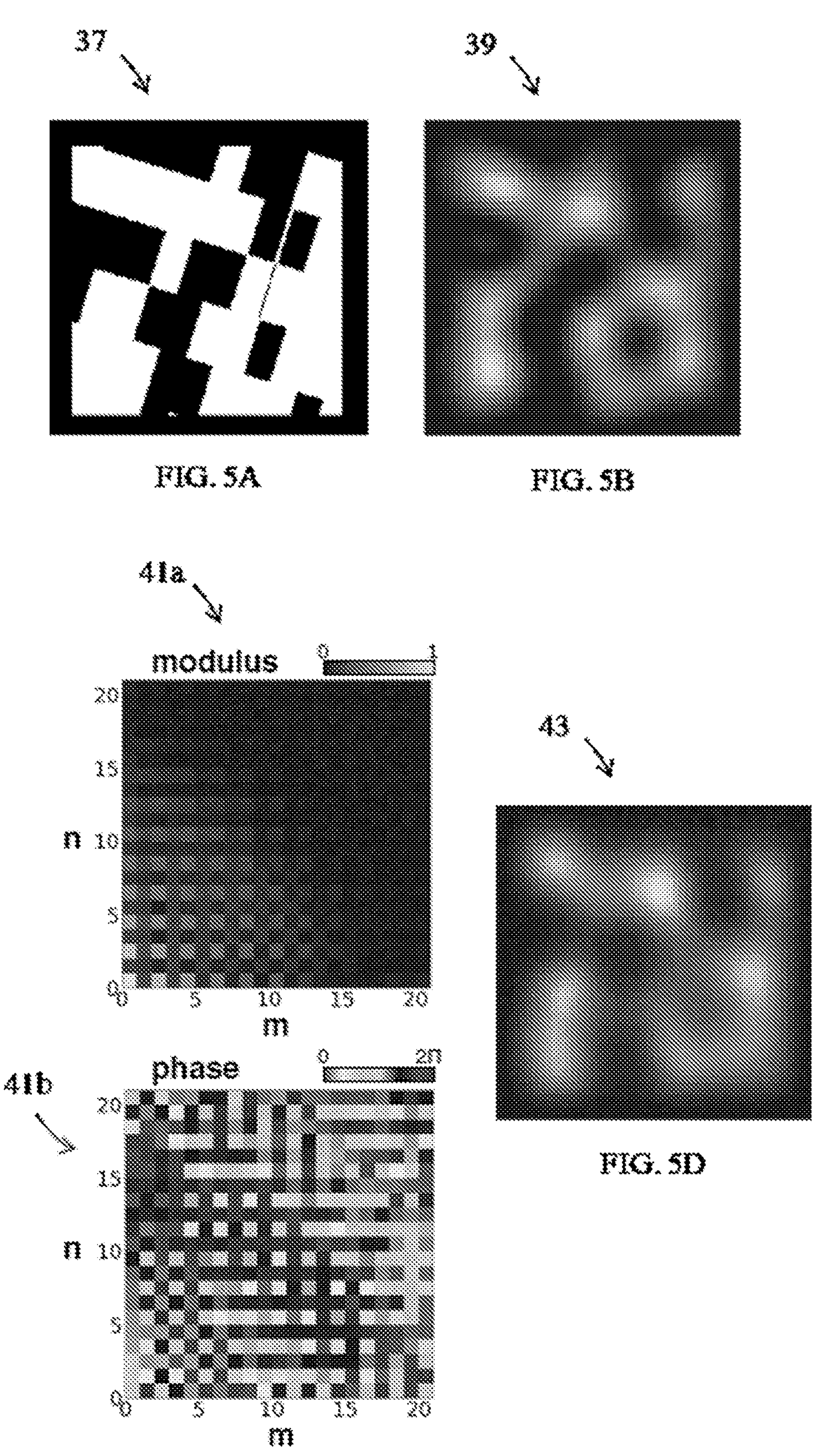
FIG. 5A illustrates an example of a training object formed by a random bitmap.
FIG. 5B shows the label generated for the training object shown in FIG. 5A.
FIG. 5C illustrates the detected signals for the test object shown in FIG. 5A.
FIG. 5D illustrates the image constructed by the neural network based on the detected signals shown in FIG. 5C.

The training object 37 may then be an image to be displayed on the DMD. For example, the training objects 37 may comprise random bitmaps or bitmaps of simple geometric shapes. FIG. 5A illustrates an example of a training object formed by a random bitmap.

In other examples, different images may be used as the training object. For example, the training object may comprise an image of an article with a known structure on the nanoscale. By way of example only, a processor or integrated circuit chip may be used. Multiple training objects may be obtained by taking images of the same article from different positions, and/or in different orientations.

For the NN training in a microscopic setting, off-the-shelf calibration slides and microplates for optical microscopes may also be used. A calibration slide of a few tens of μm size, containing several thousand training objects of size 0.5-1 μm, can be fabricated with a resolution of a few tens of nanometres by way of lithography or laser writing. This slide can be scanned in front of the objective lens in various orientations to increase the straining set size.

Where the training object is an image, it may be displayed in any suitable manner, and is not just limited to a DMD. In yet further examples, the training object may not be an image, but may be a physical article placed at the location of the object 3 in FIG. 1. For example, the object with known nanoscale structure or calibration slide may be used.

At a second step 104, the theoretically expected photocurrents that are expected when the training object 37 is illuminated by the light source 5 and the component of the reflected electromagnetic is detected in the different HG modes are computed.

This simulation is performed based on the above discussion. In a final step 106, the theoretically expected photocurrents are combined to form an image.

In the case of a one-dimensional coherent source, the simulated photocurrents are computed by question 16, and then combined by equation 20.

For the case of a two-dimensional coherent source, the simulated photocurrents are calculated by equation 21 and the reconstructed image is generated as discussed in relation to equation 23.

For a one-dimensional incoherent light source, the simulated photocurrents are generated as discussed in relation to equation 24, and the reconstructed image is generated as discussed in relation to equation 26.

For a two-dimensional incoherent light source, the simulated photocurrents are generated as discussed in relation to equation 28, and the reconstructed image is generated as discussed in relation to equation 29.

The image derived forms the label 39 for the training object 37. FIG. 5B shows the label generated for the training object 37 shown in FIG. 5A.

FIG. 4B shows a second part of the method for training the NN 27. In particular FIG. 4B illustrates the method 108 for generating the output from the NN 27 and comparing this to the label.

In a first step 110, where the training object 37, is an image, this is displayed on the DMD. Otherwise, the training object is provided in front of the objective lens.

In a second step 112, a plurality of measured signals are generated by illuminating the training object and detecting the component of the reflected electromagnetic field each of the different HG modes. This is achieved by sweeping the LO through the different HG modes and recording the photocurrent for each mode. For the coherent case, this is then processed to determine the amplitude and phase, whilst only amplitude is determined for the incoherent case.

FIG. 5C illustrates the detected signals for the test object shown in FIG. 5A, showing the amplitude 41*a* and the phase 41*b* as a function of the modes. For pre-processing of the signals, the currents are normalised between 0 and 1 for the amplitude and 0 and 2π for the phase. As discussed above, a separate normalisation of the signals occurs when they are input to the NN 27.

The measured signals 41*a*, 41*b* may then be associated with the corresponding label 39.

In a third step 114, the measured signals are processed by the NN 27 to provide a constructed image 43 captured using HGM. As discussed above, the signals must be normalised to be input into the NN 27. FIG. 5D illustrates the image 43 constructed by the NN 27 based on the detected signals shown in FIG. 5C.

In a fourth step 116, the label 39 is compared to the constructed image 43, and a difference determined. The difference (error) is then used to generate a cost function, which is used to train the NN 27 by updating the weights and/or activation functions in a fifth step 118. Any suitable error and cost function may be used.

In practice, the training is performed using a large set of training objects and associated labels. The NN 27 may be trained stochastically (updating the weights and activation functions after each training object 37) or in batches (updating the weights and cost based on the accumulated errors over a batch of training objects 37).

The cost function may be monitored over the course of the training process. The training process may be considered to be completed once the cost function is below a threshold, or once the cost function has remained below a threshold of a number of training epochs (where an epoch is processing each training image once). Alternatively, the training may be stopped after a fixed number of epochs.

To demonstrate the process discussed above, the training of a neural network 27 on a test set of data will now be described. The system discussed below is by way of example only.

In this example, a DMD with a pixel pitch of 7.56 μm was used to display 26501 training objects 37 consisting of random bitmaps as well as simple geometric shapes. The set of training objects is divided into a training and cross-validation dataset in the 90:10 proportion.

In the example being discussed, the training/cross-validation dataset included:

20000 frames that are tiled with black and white rectangles. The tile size was randomly chosen from 10 to 50 pixels in each dimension and the "colour" of each tile (i.e. whether it reflects light or does not) is also random, sampled from a uniform distribution between 0.2 and 0.8; the entire matrix was then randomly rolled along both axes and randomly oriented;

3000 random sets of 1 to 5 lines with random orientation, position and width (10 to 70 pixel);

3000 random sets of 1 to 5 segments of elliptic rings with randomly variable eccentricity and width (minor and major axis from 40 to 120 pixel, width from 10 to 15 pixel);

58 single squares of sizes 30 pixel and 70 pixel at various positions within the 210×210 frame;

441 squares of 30 pixel size at variable positions within the 210×210 frame, from which a smaller square of 10 pixel size is subtracted, with variable positions of the smaller square with respect to the larger one;

a blank image; and a square occupying the entire 210×210 pixel frame.

The light source 5 used was a continuous wave diode laser (Eagleyard EYP-DFB-0785), operating at 785 nm. The laser beam was sent through a single-mode fibre (Thorlabs P3-780PM-FC-1) in order to obtain Gaussian spatial profile.

A half-wave plate (HWP) and a polarizing beam splitter (PBS) further split it into the two paths 7*a* and 7*b*.

In the LO path 7*b*, the laser beam was magnified by a telescope (f1=50 mm, f2=200 mm) in order to fully and (almost) uniformly illuminate the screen of a reflective phase-only liquid-crystal-on-silicon SLM (Hamamatsu X13138-02, 1272×1024 pixel resolution and 12.5 μm pixel pitch). The incident beam hit the SLM screen almost perpendicularly, so that the angle between the incoming and reflected waves was smaller than 5 degrees, and polarized parallel to the SLM's LC director axis, so that all the incident light is modulated. The SLM holograms output the desired phase and amplitude profiles in the first order of diffraction, which is selected by a telescope (f1=250 mm, f2=100 mm) and an iris at its focal plane.

In the signal path 7*a*, the beam was sent through an acousto-optic modulator (AOM, Isomet 1205C-1), driven to provide a frequency shift of 92.05 MHz. The produced first diffraction order mode is incident upon the DMD (DLP LightCrafter 6500), which modulates its amplitude with the binary bitmap of the object to be imaged. This DMD includes 19200×1080 switchable micromirrors. The signal beam illuminates the central area of the DMD, where 210×210 micromirrors display the objects to be imaged. The DMD micromirrors outside that area are set to the OFF state. The micromirror pitch is 7.56 μm, so the total working area is 1.588 mm wide.

The imaging system aperture was set by an iris with diameter set to 3.5±0.03 mm placed at a distance of 245.5±1 cm from the DMD. This corresponds to an optical system of numerical aperture (NA) of (7.1±0.07)×10-4. The iris diameter was measured by placing a metal ruler next to it and imaging both these objects with a high-resolution camera. The corresponding (theoretical) coherent light Rayleigh limit 1.64λ/2NA was therefore 906 μm (120 DMD pixels). For comparison, the classical incoherent light limit 1.22λ/2NA is 674 μm (89 DMD pixels).

After the iris, a set of three telescopes magnified and collimated the signal beam in order to match the waist and wave-vector of the LO beam in the 0th order HG mode. The first telescope (f1=100 mm, f2=50 mm) collects the light transmitted through the iris. In the second (f1=50 mm, f2=100 mm) and third telescopes (f1=75 mm, f2=75 mm), the "eyepiece" lenses were mounted on translation stages to independently control the signal beam's diameter and divergence, hence enabling mode matching to the LO. The signal and LO paths were reunited at a PBS, whose output beams fed the photodetectors 23*a*, 23*b* of the balanced detector 23.

The elements of the training set were sequentially displayed on the DMD. The corresponding set of complex-valued photocurrents acquired for each of them, for 441 HG modes (n,m=0→20).

The training data was split into groups of 400 binary bitmaps. Each group was loaded into the internal memory of the DMD controller board via USB. Each loaded sequence includes 398 training objects to be imaged, a phase reference object (see FIG. 6B) and an alignment square (see FIG. 6A).

The acquisition order was set to minimize the overall measurement time, taking into account the SLM and DMD refresh times (~0.5 s and ~0.1 ms, respectively), and the time required to load new frames into the DMD internal memory (~20 s for a group of 400 binary frames). After each such group was loaded into the DMD, it was displayed sequentially while keeping the LO mode constant. The corresponding 400 photocurrents were acquired with a digital oscilloscope in a single trace, along with the AOM driving signal to keep track of the phase. The SLM hologram was updated to produce the next HG mode. The acquisition for one such group and all 441 LO modes lasted about 9 minutes. Acquiring the training set (26501 DMD frames) took approximately 10 hours.

The acquired traces were processed to extract the amplitude and phase of the heterodyne detection photocurrent for each object. The phase $\varphi_{\varphi,\mu,\nu}$ associated with the LO mode $HG_{m,n}$ and object j can then be calculated according to equation 31:

$$\phi_{j,m,n} = \left(\phi^{HD}_{j,m,n} - \phi^{AOM}_{j,m,n}\right) - \left(\phi^{HD}_{ref,m,n} - \phi^{AOM}_{ref,m,n}\right) \tag{31}$$

where each term is parentheses is the difference between the phases of the photocurrent and the AOM driving signal acquired by the oscilloscope, both oscillating at 92.05 MHz.

The relative phase between the signal and LO arms of the optical setup drifts with time. To keep track of this drift, the phase reference object (FIG. 6B) was used. The phase reference object is the union of the bottom and top-right quadrants of the DMD screen. Its asymmetric shape has nonzero overlap with all LO modes, so this object always generates a measurable photocurrent.

Because the data acquisition takes several hours, it was necessary to regularly realign the LO and signal beams with respect to each other in both transverse position and direction. The alignment object (FIG. 6A), which comprises a square of size 100×100 pixels was used. When the signal and LO are perfectly aligned, null photocurrents are expected when the LO is in modes $HG_{1,0}$ and $HG_{0,1}$. The vertical or horizontal misalignment will give rise to a nonzero photocurrent for the corresponding LO mode. This error signal is reduced by modifying the displacement and phase gradient of the SLM hologram.

It will be appreciated that this alignment procedure and object are given by way of example only. Any suitable alignment procedure and object may be used to ensure correct alignment.

Figure 7:
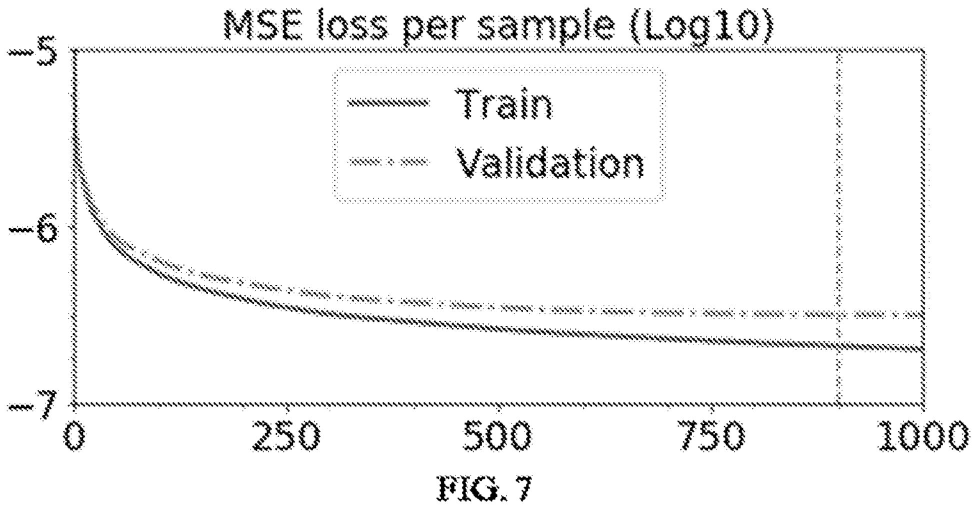
FIG. 7 shows the learning curve for the neural network of FIG. 3.

In the example being discussed, the input of the NN 27 is 441 real and imaginary components of the heterodyne output photocurrents; the output is a 50×50 bitmap containing the image. The NN architecture is shown in FIG. 2 and contains two hidden layers with 6000 units each. FIG. 7 shows the learning curve for the NN 27, i.e. the training and cross-validation loss versus the training epoch.

The optimization method used was Adaptive Moment Estimation (Adam), with a learning rate of $10^{-4}$, exponential decay rate moving parameters for the first and second moment estimates (0.9, 0.999) and weight decay 0. The batch size for the NN 27 was set to 512. A large batch size, apart from reducing the training time, also allows achieving lower training and cross-validation losses.

The loss function used was the mean squared error (MSE) loss, which makes the NN effectively behave as a nonlinear regressor. The NN 27 was trained for 900 epochs, achieving training and validation $\log_{10}$-loss of −6.674 and −6.498 per sample, respectively, as illustrated in FIG. 7.

After training, the performance of the NN was trained on unseen samples such as:

The logo and coat-of-arms of Oxford University—FIG. 8A;

Pairs of lines of varied separation—FIG. 9A;

96 text symbols from the Latin alphabet and special ASCII characters—FIG. 10A; and 56 centred pairs of vertical lines of 10 pixel thickness and varied spacing The test set was acquired as a single batch.

In order to compare the performance with traditional direct imaging methods, a direct intensity measurement with a CMOS camera (not shown) placed at the image plane of the objective lens was performed for each sample.

Figure 6A:
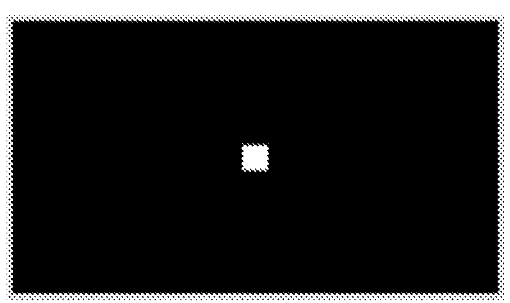
FIG. 6A shows an alignment object used in training the neural network of FIG. 3.
Figure 6B:
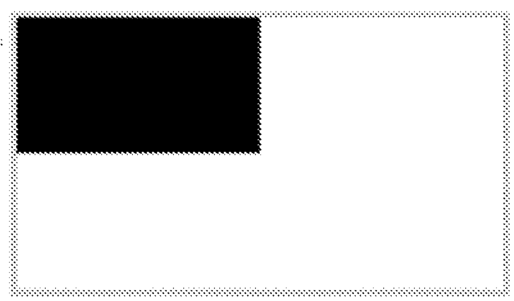
FIG. 6B shows a phase reference object used in training the neural network of FIG. 3.

Referring first to FIG. 8A, the logo and coat-of-arms were split into smaller square rasters of size 210×210 DMD pixels (shown by the grid in FIG. 6A). The logo comprises 30 of these squares and the coat-of-arms 120. Each square raster was displayed on the DMD and fed to the NN 27 in sequence. The resulting outputs were then stitched to form an image, shown in FIG. 8B. This procedure is equivalent to the transverse scanning of the object with a stride of 210×7.56=1588 μm.

The direct imaging measurement of the logo and coat-of-arms of Oxford University is shown in FIG. 8C. To replicate the HGM process, the transverse scan has also been simulated as described above, albeit with a smaller stride (10 DMD pixels) because direct imaging was more sensitive to aberrations.

Referring now to FIG. 9A, the spacing of the lines is 56 pixels in the first panel (i), 88 pixels in the second panel (ii), 100 pixels in the third panel (iii) and 110 pixels the fourth panel (iv). FIG. 9B shows the output obtained from the HGM NN 27 and FIG. 9C shows the direct imaging scan.

Referring next to FIG. 10A, the image is again split into square rasters, as shown by the grid, each character corresponding to a square raster. FIG. 10B shows the output obtained from the HGM NN 27 and FIG. 10C shows the direct imaging scan.

Qualitatively, it can be seen that the HGM reconstructions are much sharper than direct images and allowing resolution of fine details and features which otherwise could not be distinguished.

FIGS. 11A and B show the direct imaging output of the Oxford university logo and crest with Richardson-Lucy deconvolution applied. FIG. 11C illustrates the character set with the same deconvolution. As can be seen from these images, HGM is also superior to camera images post-processed with deconvolution algorithms.

The example of the spaced parallel lines (FIGS. 9A-C), can be used to quantitatively benchmark the resolution gain. FIG. 12 plots the HGM resolution as a function of the number of HG modes used in both dimensions. This shows both theoretical predictions (circles joined by line) and experimental results (square points)

To quantify the resolution, the classic Rayleigh criterion is used, i.e. that two sources are considered resolved when the intensity at their midpoint is at most 75% of the maximum intensity. FIGS. 9B and 9C show plots of the intensity taken through the centre of the HGM output, in the horizontal direction.

FIGS. 9B and 12 shows that with up to the $HG_{20,20}$ mode, two sources can be resolved at approximately one-half of the diffraction limit. In other words, the HGM resolution is comparable to the direct imaging performed using a lens that is twice as wide.

FIG. 12 also shows that the theoretical predictions on the resolution are close to the experimental results. The HGM resolution is theoretically expected to scale approximately as the inverse square root of the number of modes in each dimension. The experimentally reachable resolution is ultimately limited by the shot noise arising from the heterodyne signals, whose magnitudes rapidly fall with the mode number.

An alternative way of estimating the resolution improvement is by evaluating the mean squared error (MSE) between the reconstructed images and the original objects. The MSE $M_{DI}(NA)$ was calculated between theoretically calculated direct camera images with varying numerical apertures and the original objects. This was then compared with the MSE $M_{HGM}(NA0)$ for the HGM reconstruction with the numerical aperture $NA_0$ ($M_{DI}(NA_0)>M_{HGM}(NA_0)$). The function $M_{DI}(NA)$ monotonically decreases with NA and becomes equal to $M_{HGM}(NA_0)$ at some $NA_1>NA_0$: in other words, the image quality obtained via direct imaging with the numerical aperture $NA_1$ is similar to that with HGM and numerical aperture $NA_0$. The quantity $NA_1/NA_0$ corresponds to the resolution enhancement and is plotted, as a function of the number of modes used in HGM, in FIGS. 13A-C.

FIG. 13A shows the resolution improvement for Oxford logo. FIG. 13B shows the resolution improvement for the Oxford coat of arms. FIG. 13C shows the resolution improvement for text symbols test set. The square points represent HGM experiment, the dots represent the HGM theory, and the line represent the direct imaging experiment. Respective improvements of 1.76, 1.78 and 2.22 are shown.

The imaging process discussed above is described in relation to both coherent and incoherent imaging. The light sources in practical settings, such as microscopy and astronomy, are typically incoherent. In this case, the phases of the heterodyne detector photocurrents are random, but their amplitudes are sufficient to reconstruct the component of the image that is symmetric with respect to the reflection about the horizontal and vertical coordinate axes. The anti-symmetric components can then be reconstructed by using superpositions of HG modes as the LO (as discussed in reference [6]) or obviated by shifting the object to a single quadrant of the reference frame.

FIG. 4A discusses a method for generating labels 39 for the training objects 37 used to train the NN 27. As will be appreciated from the above discussion, a large number of training objects 37 are used to train the NN 27.

In one example, the labels 39 may be generated for all training objects 37 prior to beginning the training process. Alternatively, the labels may be generated in groups, at the same time the measured signals are detected for the training object in the first epoch of training the neural network. Alternatively, the labels may be generated one-by-one as the training object is imaged for the first time in training. The same labels may be used in each epoch of training.

In some examples, the labels 39 may be associated with the ground truth image. In the process of training the NN 27 to form a training dataset. The measured signals may be remeasured in each epoch when training the NN 27. Alternatively, the same measured signals may be used in each epoch. In this case, the measured signals may be detected in advance of the training, for example, at the same time the labels are generated. In this case, the training data set may comprise the detected signals and the label 39.

In the examples discussed above, balanced heterodyne detection is used to measure the detected photocurrents. It will be appreciated that this is by way of example only.

The heterodyne detection need not be balanced. Furthermore, whilst in the examples given above a single light source is split to provide the signal branch 7*a* and LO 7*b*, this need not be the case, and separate light sources may be used. Any suitable coherent or non-coherent light source may also be used. The person skilled in the art will also appreciate that the frequency shift between the signal 7*a* and LO 7*b* branches may be provided in any suitable way.

In the above examples, the HG modes are generated using a SLM 19. Using the scheme of [10] E. Bolduc, N. Bent, E.

Santamato, E. Karimi, and R. Boyd, Exact solution to simultaneous intensity and phase encryption with a single phase-only hologram, Opt. Lett. 38, Issue 18, pp. 3546-3549 (2013), which allows independent phase and amplitude modulation of the beam, plus the procedure of reference [9] to compensate for imperfections in the SLM 19, high-quality HG modes up to the 20-th order in both directions can be generated.

However, it will be appreciated that the HG modes may be shaped in any suitable way.

Furthermore, it will be appreciated that other techniques may be used to detect the components of the measured signal in different modes. For example, demultiplexing may also be used to detect the components of the electromagnetic field arriving from the object. This may be a reflected field, as in the case discussed above, or it may be any field emitted by the object. Heterodyne detection is relatively narrow band. For imaging of broadband objects, spatial mode demultiplexing may be used to decompose the detected field into the different HG spatial modes. Spatial demultiplexing may also be used in other scenarios.

Whether spatial demultiplexing or heterodyne detection is used, the output from the detection system will be measured photocurrents corresponding to the detected signals in the different modes. For coherent imaging these will represent both phase and amplitude and for incoherent imaging just amplitude. In either case, the processing performed by the NN 27 will be the same.

The person skilled in the art will be aware of a number of different techniques for spatial demultiplexing of signals, such as:

[11] A. Forbes, A. Dudley, and M. McLaren, Creation and detection of optical modes with spatial light modulators, Advances in Optics and Photonics 8, 200 (2016).

[12] Y. Zhou, J. Zhao, Z. Shi, S. M. H. Rafsanjani, M. Mirhosseini, Z. Zhu, A. E. Willner, and R. W. Boyd, Hermite-Gaussian mode sorter, Opt. Lett. 43, 5263 (2018).

[13] M. Hiekkamaki, S. Prabhakar, and R. Fickler, Near-perfect measuring of full-field transverse-spatial modes of light, Opt. Express 27, 31456 (2019).

[14] N. K. Fontaine, R. Ryf, H. Chen, D. T. Neilson, K. Kim, and J. Carpenter, Scalable mode sorter supporting 210 Hermite-Gaussian modes, in Optical Fiber Communication Conference Postdeadline Papers (Optical Society of America, 2018) p. Th4B.4, In order to generate the label, the theoretical currents may be generated based on the same detection technique as is used for measuring the detected currents. Alternatively, the theoretical currents may be calculated using a different detection technique.

Furthermore, the training object used may be similar in nature to the objects intended to be used for the imaging system, or different objects may be used. For example, for astronomical imaging, simulated astronomical objects may be used for training.

In the above examples, a NN 27 is used for processing the measured signals. It will be appreciated that the NN 27 described in relation to FIG. 3 is given by way of example only. The NN 27 may have any suitable feedforward or convolutional architecture, with any number of layers and any number of units in the hidden layers. The number of units in the input layer corresponds to the number of detected modes (with amplitude and optionally phase) and the number of units in the output layer corresponds to the number of pixels in the output image.

The NN 27 implements an image processing algorithm to generate an image based on the detected photocurrents. It will be appreciated that any image processing system or network which applies a trainable image processing algorithm to the detected photocurrents may be used.

Once trained, the NN 27 (or other image processing unit) can be used as part of the optical imaging system 1. Such an imaging system 1 may be used for any suitable imaging, such as microscopy or astronomical imaging.

FIG. 14 illustrates a method 200 of optical imaging using an image processing unit 27 trained as described above. In a first step 202, the component of the electromagnetic field reflected from or emitted from an object in a different spatial modes of light is detected. In a second step 204, the detected signals are processed by the trained image processing unit, to generate a super-resolution image.

In the above examples, a light source 5 is reflected from the object to measure the detected signals. However, in certain applications, such as astronomical imaging, this need not be the case. The components of any light arriving from the object may be detected. For example, incident light emitted by the object, such as fluorescence or other emission, may be detected.

The above examples describe the use of Hermite Gaussian modes of light. However, it will be appreciated that any set of transverse electromagnetic modes may be used. The modes may form an orthogonal set. For example, the modes may be Hermite Gaussian modes, and discussed above, Zernike modes, or any other suitable modes.

The invention claimed is:

1. A computer implemented method of generating training data for use in training a trainable image processing algorithm implemented on an image processor to be used in optical imaging, the method comprising:

for each spatial mode of a plurality of different spatial modes of light, detecting a component of light reflected or emitted by a first training object in that mode;

simulating an expected output of the image processor when imaging the first training object by:

for each spatial mode of the plurality of different spatial modes of light, determining a theoretically expected signal that is measured by detecting the component of light reflected or emitted by the training object in that mode; and generating an image based on the determined theoretically expected signals in the plurality of different spatial modes of light; and associating the detected components of light with the generated image, the generated image being a label for the training object, wherein a variance between the label and an image constructed by using the trainable image processing algorithm to process the detected components of light suitable is used in training the trainable image processing algorithm.

2. The method of claim 1, wherein, the components of the light corresponding to the plurality of different spatial modes of light reflected or emitted by the training object are detected by heterodyne detection, the method comprising:

using a coherent or incoherent monochromatic light source to illuminate the training object; and mixing light from the light source reflected by the training object with a local oscillator, the local oscillator in the spatial mode of light.

3. The method of claim 2, comprising:

splitting an output of the light source to provide the local oscillator and the light for illuminating the training object.

4. The method of claim 1, wherein the components of the light corresponding to the plurality of different spatial modes of light reflected or emitted by the training object are detected by spatial demultiplexing of the light reflected or emitted by the training object into the plurality of different spatial modes of light.

5. The method of claim 1, wherein:

the components of the light corresponding to the plurality of different spatial modes of light reflected or emitted by the training object are detected by spatial demultiplexing of the light reflected or emitted by the training object; and the determining of the theoretically expected signals includes modelling use of spatial demultiplexing for detecting the components of the light corresponding to the plurality of different spatial modes of light reflected or emitted by the training object.

6. The method of claim 1, wherein the different spatial modes of light are transverse modes.

7. The method of claim 6, wherein the spatial modes of light are Hermite-Gaussian modes or Zernike modes.

8. The method of claim 1 wherein the different spatial modes of light form an orthogonal set of modes of light.

9. The method of claim 1, wherein the plurality of different spatial modes of light includes at least 25 modes of light.

10. The method of claim 1, wherein the training object comprises an image of an article having nanoscale features and predefined structure, and the method comprises generating a plurality of different training objects using images of the same article in different positions and/or orientations.

11. The method of claim 1, wherein the training object comprises a bitmap image comprising a random pattern or combination of simple geometric shapes.

12. A non-transitory machine-readable computer medium containing instructions, when executed by a machine, cause the machine to perform the method of claim 1.

13. The method of claim 1, wherein:

detecting the component of light reflected by the first training object in a first spatial mode of the plurality of different spatial modes of light comprises:

detecting light reflected by the first training object;

providing a reference signal shaped into the first spatial mode of light, the detected light and reference signal being frequency shifted;

combining the light reflected by the first training object and the reference signal at a beam splitter;

detecting the signals from both outputs of the beamsplitter; and determining a difference between the signals from both outputs of the beamsplitter to determine the component of light reflected by the first training object in the first spatial mode of the plurality of different spatial modes of light;

determining of the theoretically expected signal in the first mode includes modelling the steps used to detect the component of the light corresponding to the first mode of the plurality of different spatial modes of light.

14. A method of training an image processor for use in optical imaging, the image processor configured to use a trainable image processing algorithm to process light reflected or emitted by an object in each spatial mode of a plurality of different spatial modes of light to generate an image of the object, the method comprising:

generating a set of training data by providing a plurality of training objects, and for each training object, detecting the component of light reflected or emitted by the training object in each spatial mode of the plurality of different spatial modes of light;

for each spatial mode of the plurality of different spatial modes of light, determining a theoretically expected signal that is measured by detecting the component of light reflected or emitted by the training object; and generating an image based on the determined theoretically expected signals in the plurality of different spatial modes of light;

and associating the detected components of light with the generated image, the generated image being a label for the training object;

using the image processor to construct detected images of the plurality of training objects by using the trainable image processing algorithm to process the detected components of light;

comparing the images constructed by the image processor to the associated label for each training object to determine a variance between the image constructed by the image processor and the associated label; and updating the trainable image processing algorithm based on the determined variance between the image constructed by the image processor and the associated label.

15. The method of any of claim 14, wherein amplitudes of the detected components are provided as inputs to the image processing algorithm.

16. The method of claim 15, further comprising: determining phases of the detected components and providing the phase as an input to the image processing algorithm with the amplitudes.

17. The method of claim 14, wherein the image processor comprises a neural network configured to implement the trainable image processing algorithm, the neural network having:

an input layer arranged to receive the detected components;

an output layer arranged to provide the image constructed from the detected components;

one or more hidden layers between the input layer and output layer; and couplings to provide signals between adjacent layers, wherein the image processing unit algorithm comprises weights applied to signals sent from one layer to a next layer and activation functions applied to the detected components, at the units within the layers, to construct an image as an output; and wherein updating the trainable image processing algorithm comprises updating the weights and activation functions based on the variance between the images constructed by the image processor and the label.

18. A method of optical imaging comprising:

for each spatial mode of a plurality of different spatial modes of light, detecting a component of light reflected or emitted by an object, the detected component corresponding to the mode; and generating an image using an image processor trained in accordance with the method of claim 14.

19. The method of optical imaging as claimed in claim 18, wherein the component of light arriving from the object in each of the plurality of different spatial modes of light is detected by spatial demultiplexing of the light reflected or emitted by the object.

20. The method of claim 18, wherein:

detecting the component of light reflected by the object in a first spatial mode of the plurality of different spatial modes of light comprises:

detecting light reflected by the object;

providing a reference signal shaped into the first spatial mode of light, the detected light and reference signal being frequency shifted;

combining the light reflected by the object and the reference signal at a beam splitter;

detecting the signals from both outputs of the beam-splitter; and determining a difference between the signals from both outputs of the beamsplitter to determine the component of light reflected by the object in the first spatial mode of the plurality of different spatial modes of light.

* * * * *